J. M. CHRISTINE.
AUTOMATIC WEAR TAKE-UP FOR JOURNAL BOXES.
APPLICATION FILED JULY 14, 1917.
1,273,822.
Patented July 30, 1918.
2 SHEETS—SHEET 1.
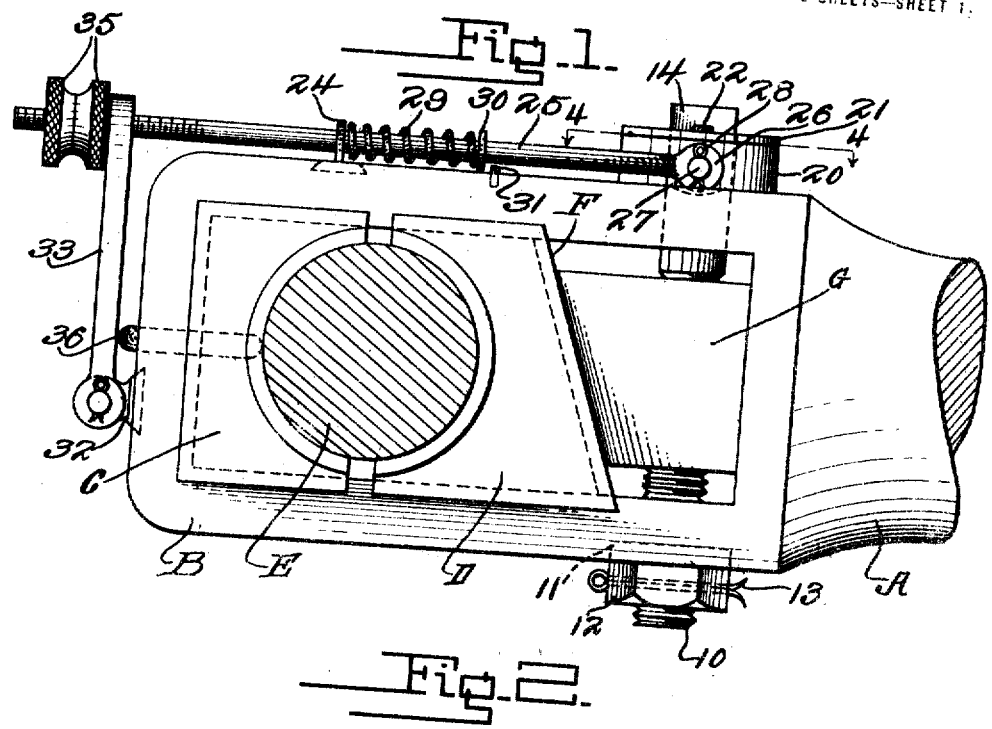
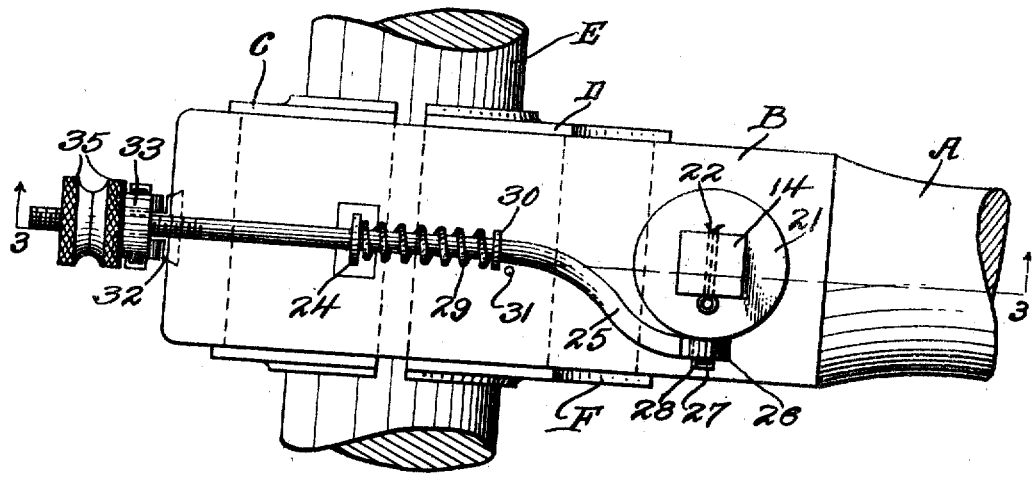
J. M. Christine, Inventor

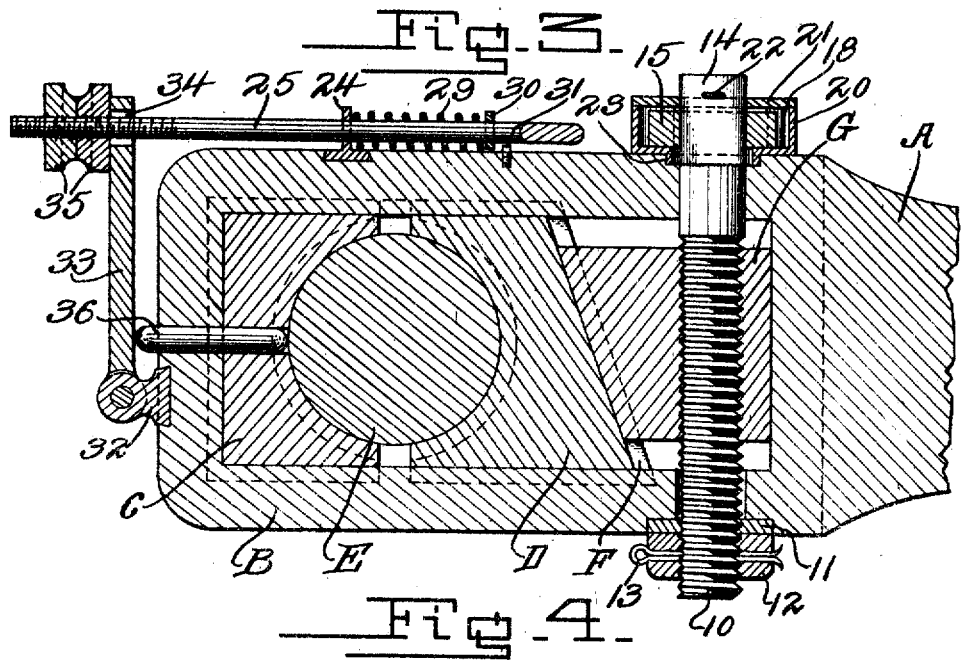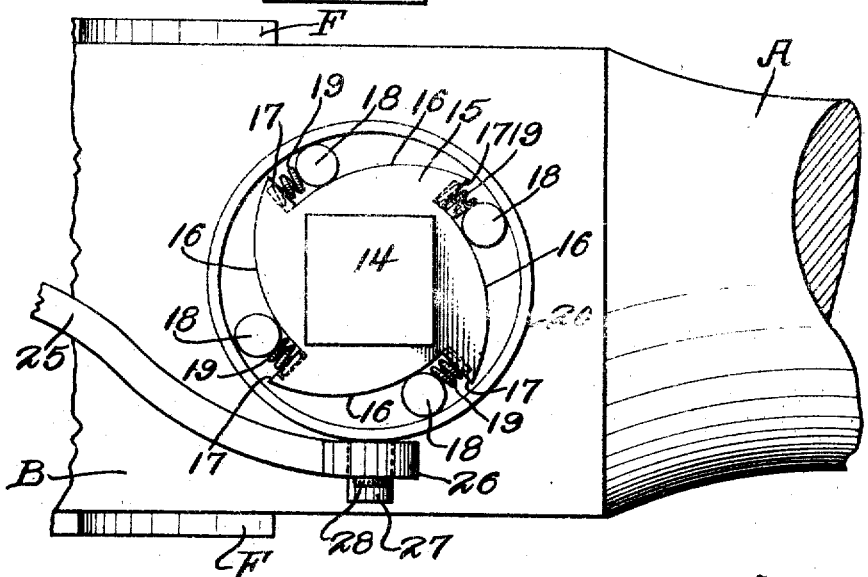

UNITED STATES PATENT OFFICE.

JOHN M. CHRISTINE, OF FORD CITY, PENNSYLVANIA.

AUTOMATIC WEAR TAKE-UP FOR JOURNAL-BOXES.

1,273,822.
Specification of Letters Patent.
Patented July 30, 1918.

Application filed July 14, 1917. Serial No. 180,543.

*To all whom it may concern:*

Be it known that I, JOHN M. CHRISTINE, a citizen of the United States, and a resident of Ford City, in the county of Armstrong and State of Pennsylvania, have invented a certain new and useful Improvement in Automatic Wear Take-Ups for Journal-Boxes, of which the following is a specification.

The present invention relates to journal boxes, and the like, and more particularly to means for adjusting the bearing members against the crank head or shaft journaled in the box.

An object of the present invention is to provide a device designed to maintain bearings, particularly of the reciprocating type, in proper engagement with the shaft or pin; which will operate automatically without stopping the machinery; and which does not depend upon the skill and judgment of the mechanic to secure the parts in proper tight-fitting engagement.

Heretofore, bearings have been adjusted to take up wear and vibration by manual adjustment with the result that the frequent improper adjustment results in the rapid wearing and unsatisfactory service in the bearing, and the jar incident to excessive vibration of the connected parts exerts undue strain and wear upon the same.

It is the purpose of the present invention, therefore, to provide means actuated by the vibration of the bearing to take up the wear and thus automatically maintain the parts in their proper operative positions.

The above, and various other objects and advantages of this invention will be in part described, and in part understood, from the following detailed description of the present preferred embodiment, the same being illustrated in the accompanying drawings wherein:

Figure 1 is a side elevation of a bearing provided with the automatic wear taking up means of this invention, the shaft or pin being shown in section and mounted in the bearing.

Fig. 2 is a top plan view of the same.

Fig. 3 is a longitudinal section taken through the bearing, showing the automatic take up means mounted thereon.

Fig. 4 is an edge view of the bearing taken substantially in the plan indicated by the line 4—4 in Fig. 1.

Referring to these drawings, A indicates one end of a connecting rod or the like provided with a journal box B of open construction, and in which is fitted a pair of opposed pillows or boxes C and D adapted to embrace therebetween a shaft or pin E. The pillow C is the stationary pillow and is held in the outer end of the journal box B, and the pillow D is the movable pillow and is provided with an outer beveled or inclined edge F suitably grooved to receive therein the adjacent correspondingly formed edge portion of the wedge block G. The wedge block G is provided with a threaded aperture therethrough adapted to receive an advancing screw 10.

The advancing screw 10 projects through the opposite sides of the journal box B and is supported thereby, and provided upon one end, which is the lower end as shown in Fig. 3, with a washer 11 engaging the adjacent side of the journal box B, and a retaining nut 12 threaded upon the lower end of the screw 10 and being preferably held in position thereon by a transversely extending cotter pin 13. The opposite end of the screw 10 is provided with an angular shank 14 receiving thereover a ratchet wheel 15 having relatively few teeth and provided with relatively long cam faces 16 between the teeth. The teeth form shoulders 17 at the inner ends of the cam faces 16, and rollers or balls 18 are arranged against the cam faces 16, and are of a diameter slightly greater than the depth of the shoulders 17. Springs 19 are seated at one end in the shoulders 17, and engage at their opposite ends against the adjacent sides of the rollers 18 to urge the latter over the cam faces 16 and outwardly from the axis of rotation of the ratchet wheel 15.

The ratchet wheel 15 is inclosed in a cylindrical casing or housing 20, the inner wall of which is of a diameter but slightly greater than the largest diameter of the ratchet wheel 15, and these rollers or balls 18 engage against the inner wall of the casing 20. The rollers 18 are wedged by the springs 19 between the cam faces 16 and the inner wall of the casing 20 to bind the latter to the ratchet wheel 15 to turn the same when the casing 20 is advanced.

The casing 20 is closed at its outer side by a washer plate 21 which surrounds the outer end of the shank 14, and is held in place against the casing 20 by a cotter pin 22, or the like. The casing 20 is adapted to turn about the shank 14 and the ratchet wheel 15, and is provided with a relatively large opening in its bottom having a marginal downturned flange 23 thereat projecting into a countersink in the adjacent side of the journal box B.

A bracket 24 of substantially inverted T-shape is dovetailed at its base portion, or otherwise suitably secured to the adjacent side of the journal box B, and has an opening through the outstanding portion thereof adapted to slidably receive a rod 25 therethrough. The rod 25 extends longitudinally of the journal box B and has its major portion located preferably intermediate the lateral edges of the journal box, and has its inner end bent laterally and formed with a flattened eye 26 loosely receiving therethrough a projection 27 carried upon the adjacent side of the casing 20. A cotter pin 28 passes transversely through the outer end of the projection 27 to hold the eye 26 in place. The projection 27 fits into the eye 26, and is adapted to rock slightly therein by the longitudinal movement of the rod 25 to reciprocate the casing 20. A spring 29 of the helical type, surrounds the rod 25 and bears at one end against the bracket 24. A collar 30 is fixed to the rod 25 and is adapted to engage the opposite end of the spring 29 for compressing the same upon the outward movement of the rod 25. The inward movement of the rod 25 may be limited by the provision of a screw pin 31 threaded into the adjacent side of the journal box B and in the path of the washer 30 to limit the inward movement of the same.

The outer end of the journal box B is provided with a hinge bracket 32, dovetailed or otherwise suitably secured to the journal box adjacent the lower side of the same. A lever 33 is hinged at one end to the bracket 32 and is provided at its opposite end with a relatively large opening 34 through which the outer end of the rod 25 projects. The outer end of the rod 25 is screw-threaded and is adapted to receive thereover a pair of lock nuts 35 adapted to be turned up against the free end of the lever 33 to connect the rod 25 thereto. A reciprocating pin 36 is slidably mounted through the outer end of the journal box B, and extends through a registering opening formed in the stationary pillow C. The opposite ends of the pin 36 are preferably rounded, and one end engages the shaft E and the opposite end bears against the inner side of the lever 33.

When the device of this invention is applied to a bearing as shown in the drawings, the lock nuts 35 are turned up upon the rod 25 and against the lever 33 to place the spring 29 under slight tension. When the bearing surfaces of the shaft E and the pillows C and D are worn, the shaft E bears against the pin 36 and advances the same outwardlly against the lever 33 and swings the operating lever about the hinged bracket 32, with the result that the rod 25 is drawn outwardly and longitudinally through its bracket 24 and the casing 20 is slightly turned. When the casing 20 is turned in this direction, the wedging members 18, bind between the cam faces 16 and the inner wall of the casing 20, with the result that the ratchet wheel 15 and the feeding screw 10 are turned therewith. The turning of the screw 10 advances the wedge block G in a direction to bind against the movable pillow D and thus take up wear between the parts of the bearing and the shaft E.

As soon as further wear is effected upon the parts of the bearing, the pin 36 is permitted to move inwardly, and upon vibration of the shaft E with respect to the journal box B, the pin 36 is again forced outwardly so that at first the spring 29 is free to urge the rod 25 in a direction to turn the casing 20 in an opposite direction, and then the pin 36 draws the rod 25 outwardly and returns the casing 20 in such direction as to rotate the ratchet wheel 15 and the feed screw 10 therewith. Thus, by the rocking vibration of the shaft E within the journal box B, the pin 36 is reciprocated longitudinally and the rod 25 is moved in and out with respect to the end of the journal box with the result that the casing 20 is reciprocated. This reciprocation of the casing 20 insures the intermittent advancement of the ratchet wheel 15 and the screw 10 connected thereto so that the wear upon the parts of the bearing and the shaft E is gradually taken up, and it continues the taking up for an indefinite time.

The operation of the device is entirely automatic, and requires only an initial adjustment of the parts.

It will be observed that the operating pin 36 is arranged at the side of the shaft E diametrically opposite to that side at which the advancing wedge G is located so that the wedge is advanced when pressure is exerted upon the relatively stationary pillow block G. Such arrangement relieves the movable pillow block D from strain or pressure of the shaft E so that the movable pillow block may be freely advanced by the mechanism without overcoming the pressure of the shaft. It has been found by actual tests that this is the most satisfactory arrangement of the parts, and that the parts are subjected to less wear and strain under these conditions.

It is of course understood that various changes and modifications may be made in the details of construction and design of the above specifically described embodiment, of the invention, without departing from the spirit of the invention, such changes being restricted only by the scope of the following claims.

The lock nuts 35 may be adjusted upon the stem 25 and vary the degree of adjustment of the lever or arm 33 to admit of the required movement between the pillows C and D and the shaft E for the expansion of the same, and to admit the desired oil film between these parts.

I claim:

1. In combination with a journal box having a movable element therein adapted to engage a shaft, of advancing means carried by the journal box to move the element against the shaft, and operating means connected to the advancing means and including a part independent of said element projecting into the journal box into contact with the shaft therein and adapted to be actuated upon vibration of the shaft for advancing the element thereagainst.

2. In combination with a journal box having a movable element therein adapted to engage a shaft, of means for advancing the element against the shaft to take up wear, operating means for said advancing means including a reciprocating part, a pin slidable in the journal box and adapted to bear against the shaft, and a tensioned connection between the pin and said reciprocating part to retain the pin against the shaft and to retain said part yieldingly in one position.

3. In combination with a journal box having a movable element therein adapted to receive a shaft, a threaded pin traversing one end of the journal box, an intermittent clutch mechanism connected to said pin, a wedge block mounted on said pin adapted to engage against said movable element to advance the same against the shaft, a lever hinged to the end of the journal box, a pin slidable through the journal box adapted to engage the shaft and to be reciprocated thereby, and a connecting rod between said lever and said clutch mechanism for actuating the latter upon the rocking of the lever by the pin.

4. In combination with a journal box having a movable element therein adapted to engage a shaft, a screw mounted at one end of the journal box, a wedge block mounted upon the screw adapted to be advanced against said movable element, an intermittent clutch mechanism connected to said screw, a rod connected at one end to the clutch mechanism, a spring engaging the rod to urge the same in one direction, a lever mounted on the journal box, and having connection with the rod, and a pin slidable through the journal box engaging the lever at one end and adapted to engage the shaft at its opposite end, said pin being adapted to be rocked by the vibration of the shaft in the journal box to actuate said rod and said intermittent clutch device.

5. In combination with a journal box having a movable element therein adapted to engage a shaft, advancing means carried by the journal box, and operating means connected to the advancing means and including an element projecting into the journal box for contact with the shaft at a point diametrically opposite to said movable element and adapted to actuate the latter when relieved of pressure of the shaft.

6. In combination with a journal box having a movable element therein adapted to engage a shaft, means for advancing the element against a shaft, to take up wear, operating means for said advancing means, and an actuating element independent of the advancing element connected to the operating means and adapted to engage the shaft in the journal box and adapted to be moved by vibration of the shaft to advance said movable element.

7. In an automatic take-up device for journal boxes, the combination of a take up member, and operating means having an element independent of the member adapted to be moved by vibration of the shaft to advance the member against the shaft.

8. In combination with a journal box having a pillow movably mounted therein and adapted to engage a shaft, a feed screw journaled in the box, a wedge block mounted on the feed screw and engaging said pillow to advance the same against the shaft, a ratchet wheel mounted on the feed screw, a casing surrounding the ratchet wheel, intermittent clutch devices arranged between the ratchet wheel and the casing, a rod connected to the casing, a lever pivoted to the journal box, a pin slidable through the journal box adapted to engage the shaft, a spring connected to the rod for urging the latter in one direction to turn said casing about the ratchet wheel in one direction, and connection means between the rod and the lever to tension the rod and lever against the pin, said pin being adapted to reciprocate with the vibration of the shaft to reciprocate the casing about the ratchet wheel and intermittently advance the feed screw for taking up wear between the shaft and said pillow.

9. The combination with a journal box having a movable member therein, of a spring pressed rod, means including an oscillatable element pivoted to the rod for advancing the movable member and urged in one direction by the rod, a lever pivoted at one end to the end of the journal box and slidably receiving said rod through its other end, a pin slidably mounted in the journal box between the shaft and the lever, and adjustable lock nuts mounted on the rod beyond the lever adapted to be turned up against the lever for tensioning the pin against the shaft.

JOHN M. CHRISTINE.